US012775092B2

(12) United States Patent
Kolobov et al.

(10) Patent No.: US 12,775,092 B2
(45) Date of Patent: Oct. 27, 2026

(54) GLASS WALLS AND DOORS DETECTION AND DISTANCE MEASURING FOR ROBOTS AND METHOD OF CONTROLLING THE SAME

(71) Applicant: PROX SG Pte Ltd, Singapore (SG)

(72) Inventors: Mikhail Kolobov, Singapore (SG); Oleg Kolobov, St. Petersburg (RU); Aleksandr Platonov, St. Petersburg (RU); Maksim Kolobov, St. Petersburg (RU)

(73) Assignee: Mike IP Holdings Pte. Ltd., Singapore (SG)

( * ) Notice: Subject to any disclaimer, the term of this patent is extended or adjusted under 35 U.S.C. 154(b) by 234 days.

(21) Appl. No.: 18/644,134

(22) Filed: Apr. 24, 2024

(65) Prior Publication Data

US 2024/0361460 A1 Oct. 31, 2024

(30) Foreign Application Priority Data

Apr. 27, 2023 (SG) ........................... 10202301175Q

(51) Int. Cl.
*G01S 17/48* (2006.01)
*G01J 5/10* (2006.01)
*G01S 17/93* (2020.01)
*G01J 5/00* (2022.01)

(52) U.S. Cl.
CPC ................. *G01S 17/48* (2013.01); *G01J 5/10* (2013.01); *G01S 17/93* (2013.01); *G01J 2005/0077* (2013.01)

(58) Field of Classification Search
None
See application file for complete search history.

(56) References Cited

U.S. PATENT DOCUMENTS

2014/0016113 A1* 1/2014 Holt ......................... G01C 3/08 356/3.11
2021/0270677 A1* 9/2021 Man ...................... G01J 5/0804
2023/0083293 A1* 3/2023 Xu .......................... G06T 17/00 356/4.01

OTHER PUBLICATIONS

Extended European Search Report of European Patent Application No. 24171069.8 dated Sep. 18, 2024 (9 pages).
Search Report of Singapore Patent Application No. 10202301175Q dated Apr. 28, 2026 (2 pages).
(Continued)

*Primary Examiner* — Hoon K Song
(74) *Attorney, Agent, or Firm* — Pyprus Pte Ltd; George Liu

(57) ABSTRACT

A method for detecting glass wall with reflective surface for an autonomous system. The method comprises deploying at least one IR imaging device and at least one IR emitter on the autonomous system, wherein the IR imaging device comprises a field-of-view (FOV); emitting, by an IR thermal emitter, an IR thermal signature from the autonomous system, wherein the IR thermal signature is located outside of the FOV; detecting presence of the IR thermal signature that reflects on the reflective surface; and determining a distance and angle of the autonomous system from the reflective surface based on the reflected IR thermal signature within the FOV. The reflective surface will be identify as the glass wall. A sensor assembly and an autonomous system is also provided.

8 Claims, 5 Drawing Sheets

(56) References Cited

OTHER PUBLICATIONS

Written Opinion of Singapore Patent Application No. 10202301175Q dated Apr. 30, 2026 (6 pages).
Agilent Application Note: Measuring the reflective properties of architectural glass using the Agilent Cary 630 FTIR with 10 degree Specular Reflectance Accessory, Apr. 1, 2013.
R.J. Martín-Palma et al., Silver-based low-emissivity coatings for architectural windows: Optical and structural properties. Solar Energy Materials and Solar Cells, May 12, 1998, vol. 53, No. 1-2, pp. 55-66.

* cited by examiner $$L_1 = L_2 \Rightarrow \alpha_1 = \alpha_2$$

$$\Rightarrow D = \frac{\frac{L_1}{2}}{tan\alpha_1} = \frac{\frac{L_2}{2}}{tan\alpha_2}$$

GLASS WALLS AND DOORS DETECTION AND DISTANCE MEASURING FOR ROBOTS AND METHOD OF CONTROLLING THE SAME

FIELD OF THE INVENTION

The present invention relates to robots where the detection of glass walls and doors is required for navigation and collision avoidance. The invention is related to delivery, cleaning, home, human aid, and other robots.

BACKGROUND

Autonomous vehicles like vacuum cleaning robots, delivery robots, and flying drones are supposed to navigate inside facilities or outdoors in unmanned mode or remote-controlled mode. For this purpose, the robots are usually equipped with a number of sensors (ultrasound, laser range finders, LIDARs, microwave, image sensors, etc.) to avoid collision with different kinds of obstacles.

Glass is a very common material in buildings nowadays, but the above-mentioned sensors have significant difficulties with the detection of glass walls and doors: glass is transparent for lasers, LIDARs, and microwaves and in most cases, glass walls/doors couldn't be detected by these sensors with confidence. Meanwhile, ultrasound sensors can't provide accuracy enough, especially to detect glass edges.

The very common solution to mitigate the issue is to install touch sensors, buttons, or other sensors on a robot to detect collision with obstacles once it happens, but this solution does not prevent collisions.

Therefore, it is desired, through the present invention to provide a system and method for detecting see through objects, such as glass panel/wall for a autonomous system.

This invention provides glass walls and doors detection and distance measurement device for robots and methods of controlling the same. It is also desired that the present invention offers a highly cost effective solution which can be implemented or added to any existing autonomous system.

SUMMARY

The present invention seeks a method and system for detecting glass wall/reflective surfaces for autonomous system. In one aspect of the present invention, there is provided a method for detecting glass wall with reflective surface for an autonomous system. The method comprises deploying at least one IR imaging device and at least one IR emitter on the autonomous system, wherein the IR imaging device comprises a field-of-view (FOV); emitting, by an IR thermal emitter, an IR thermal signature from the autonomous system, wherein the IR thermal signature is located outside of the FOV; detecting presence of the IR thermal signature that reflects on the reflective surface; and determining a distance and angle of the autonomous system from the reflective surface based on the reflected IR thermal signature within the FOV. The reflective surface will be identify as the glass wall.

In one embodiment, each IR emitter comprising resistors arranged to emits the thermal signature.

In another embodiment, wherein the IR emitter comprising a resistor array arranged to form the thermal signature.

In a further embodiment, the autonomous system determines the distance and angle based on triangulation method.

In yet another embodiment, the IR thermal emitter emits the thermal signature within a long-wavelength IR band.

In another aspect of the present invention there is provided a sensor assembly of an autonomous system adapted for detecting glass wall. The sensor assembly comprises at least one infrared (IR) thermal sensor having a Field-of-View (FOV); and at least one IR emitter that operationally emits a thermal signature. Operationally, when IR thermal signature is reflected on a reflected surface and the reflected IR thermal signature is captured within the FOV, the sensor assembly determines a distance and angle of the IR sensor from the reflective surface and the reflective surface is identified as a glass wall.

In one embodiment, each of the IR emitter comprises a resistor array, each resistor unit of the resistor array forms a pixel of the thermal signature.

In yet another embodiment, the thermal signature is within a long-wavelength IR spectrum.

In a further embodiment, the distance and angle are determined through triangulation.

In yet a further aspect, there is provided an autonomous system having the aforesaid a sensor assembly.

BRIEF DESCRIPTION OF THE DRAWINGS

This invention will be described by way of non-limiting embodiments of the present invention, with reference to the accompanying drawings, in which.

DETAILED DESCRIPTIONS

Figure 1:
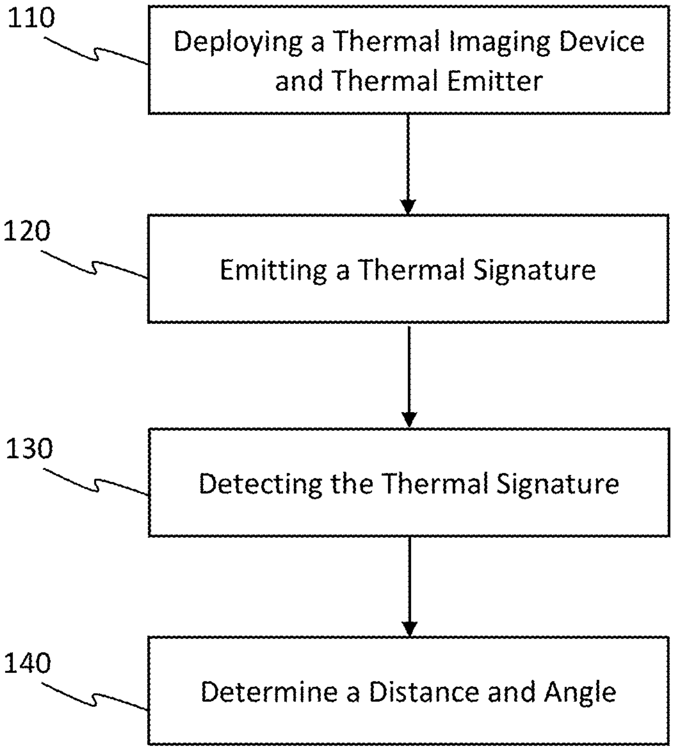
FIG. 1 illustrates a method of detecting a glass wall for autonomous system in accordance with an embodiment of the present invention.

In line with the above summary, the following description of a number of specific and alternative embodiments are provided to understand the inventive features of the present invention. It shall be apparent to one skilled in the art, however that this invention may be practiced without such specific details. Some of the details may not be described at length so as not to obscure the invention. For ease of reference, common reference numerals will be used throughout the figures when referring to the same or similar features common to the figures.

The invention is made based on reflectivity of window glass within the infrared (IR) spectrum, in at least between 8-15 μm (i.e. long wavelength IR), which corresponds to object temperatures between −80° C. to +89° C.

According to Wikipedia, this is The "thermal imaging" region, in which sensors can obtain a completely passive image of objects only slightly higher in temperature than room temperature—for example, the human body—based on thermal emissions only and requiring no illumination such as the sun, moon, or infrared illuminator. This region is also called the "thermal infrared". [see "Infrared", Wikipedia.org (online), from <URL: https:/en.wikipedia.org/wiki/Infrared>].

Figure 7:
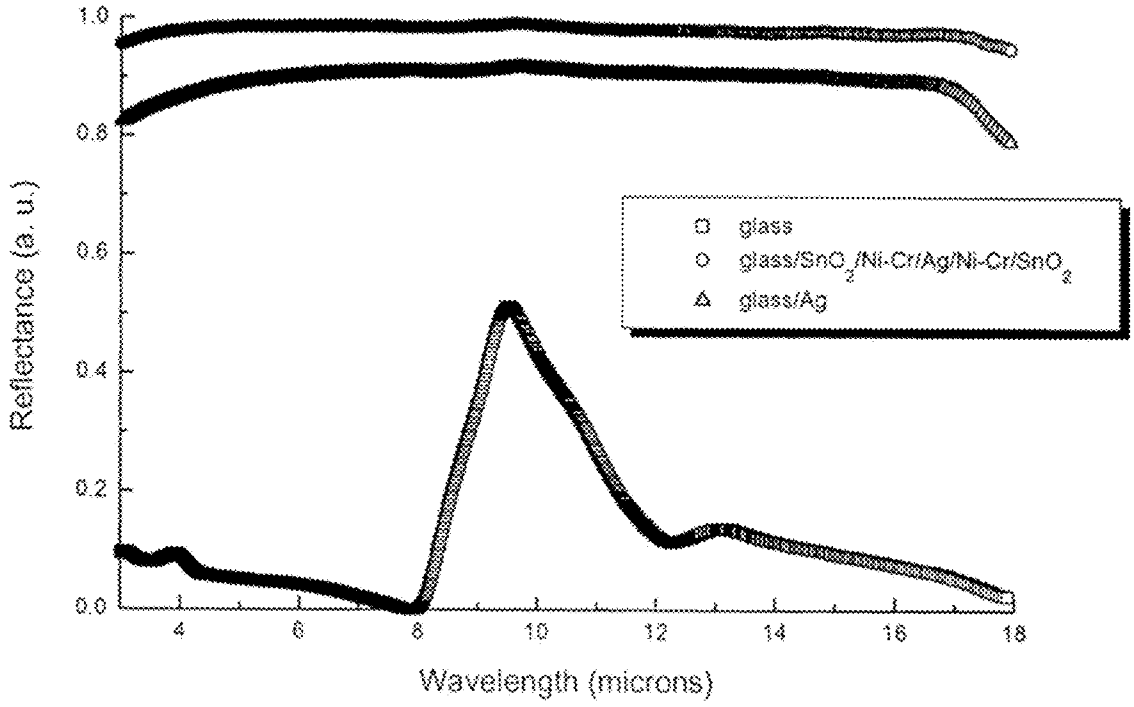
FIG. 7 shows a graph of reflectance value of various types of glasses taken from researchgate.net.

FIG. 7 shows a graph of reflectance value of various types of glasses. Raul J Martin-Palma, et. al. "*Silver-based low-emissivity coatings for architectural windows: Optical and structural properties*". ResearchGate.net [online], May, 1998, [retrieved 16 Mar. 2023], from <URL: https://www.researchgate.net/publication/>. As shown, common glass has reflectance above 20% for a wavelength in a band of around 8.5 to 11.5 μm. In other word, objects that emits wavelength of range could be detected by very common thermal imaging devices and cameras. Take for example, a low cost thermal sensor used in SeekThermal CompactPRO™ is sufficient to detect objects with temperatures from −40° C. to +330° C., which mostly cover the LWIR band. Said thermal can be a 206×156 thermal sensor with 36° wide FOV lens, for example.

Any object with a temperature between about −20° C. to +65° C. can be a source of IR radiation in the band 8.5 to 11.5 μm [see sspickle "*Blackbody wavelength from temperature*", May, 2017, [retrieved: 16 Mar. 2023], from URL: <https://www.vcalc.com/wiki/sspickle/>]. In light of the above, it is an object of the present invention is to provide a glass wall detection system and method therefor, in which an IR camera and an IR emitter is mounted on an autonomous device to obtain directional information about an IR thermal signature emitted by the IR emitter and reflected on the glass wall, and then to calculate a distance from the autonomous device to the glass wall.

The IR camera can be any device that could obtain a thermal image of objects. The device may (or may not) include an image processor to search signature of the IR emitter and send to the robot information about the detected glass wall (direction and/or distance), or send raw (or pre-processed) image data to the final processing by an external device (for instance, robot's computer).

IR emitter could be any device whose temperature differs from the surrounding's temperature, and that difference can be detected by the IR camera. A hot IR source could be as simple as a resistor, which transforms electrical power to heat.

It is understood that the system of embodiments of the present invention requires a processing unit, such as a computer device, inbuilt or dedicated, to process the captured data from the IR camera. Understanding the laws of reflections, the system uses triangulation to calculate the distance between the device and the reflective surface. That involves using the known angle of the incidence and the distance between the imaging device and the emitter, to calculate the distance between the camera and the reflective surface.

FIG. 1 illustrates a method of detecting a glass wall for autonomous system, such as robot, in accordance with an embodiment of the present invention. The method comprising deploying a infra-red (IR) imaging device and a IR emitter on a autonomous system at step 110; emitting an IR thermal signature from the antonomous system, through the IR emitter at step 120; detecting the IR thermal signature that reflected on a reflective surface that enters a Field-of-View (FOV) of the IR imaging device at step 130; determining a distance and an angle of the autonomous system to the reflective surface based on the IR thermal signature at step 140.

In step 110, the autonomous system is deployed with one or more IR imaging device to scan an area of interest to determine if any glass panel/wall presences within the FOV of the imaging device. In step 120, there may be provided one or more devices that emits one or more IR thermal signature from the autonomous system. It is desired that the IR thermal signature can be uniquely identify as (from) the autonomous system. The IR thermal signature is reflectable by any reflective surface, such as glass wall. The advantage of initialising thermal signature in IR spectrum is that it will be reflected even the glass is transparent glass, hence, the method disclose herein is capable of detecting transparent glass panel/wall for autonomous systems/devices. When the IR thermal signature is reflected on any glass panel/wall and the reflected (on the glass panel/wall) JR thermal signature falls within the FOV of the JR imaging device at step 130, the autonomous system would recognise that a glass panel/wall is within the FOV of the IR imaging device. It follows that, in step 140, the distance and the angle/direction from the IR imaging device and the glass panel/wall can be calculated accordingly.

Figure 2A:
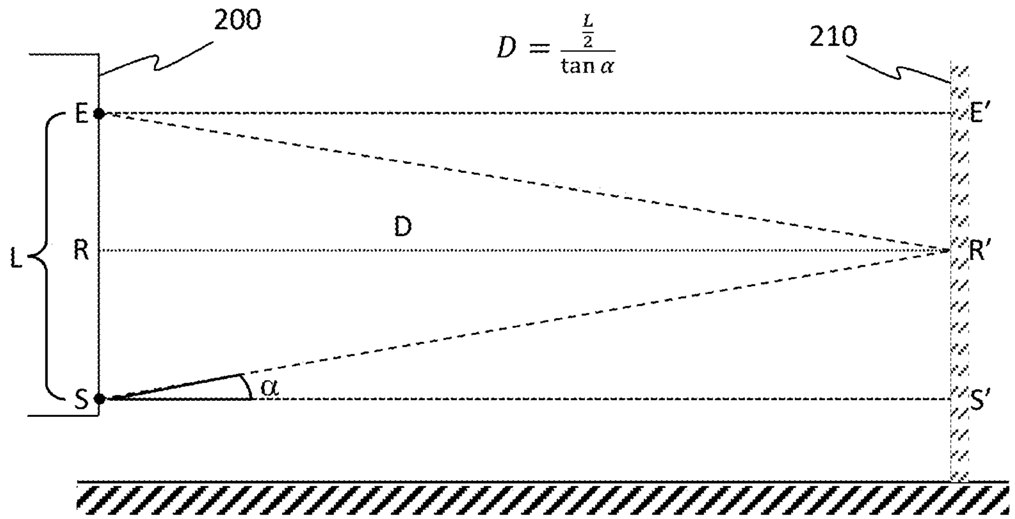
FIG. 2A exemplifies a side view showing an autonomous system facing a glass wall according to an embodiment of the present invention.

FIG. 2A exemplifies a side view showing an autonomous system 200 facing a glass wall 210 according to an embodiment of the present invention. In FIG. 2, it shows a side view of the autonomous system 200 disposed with its front side facing a glass wall 210, whereby a distance between the front side of the autonomous system 200 (i.e. the IR sensor S) and the glass wall 210 can be determined. In this embodiment, a IR sensor S is mounted below an LWIR emitter E forming a vertical axis on the front side of the autonomous system 200 whereby the front face (ES) of the autonomous system 200 and it is parallel to the glass wall 210. The IR sensor S has a Field-of-View (FOV) that detects/captures IR thermal signatures. It is to be noted that position and orientations of the IR emitter E relative to the IR sensor S is configured in a manner that operationally, the IR thermal signature emitted by the IR emitter E is not directly detectable by the IR sensor S, i.e. fall out of the FOV. L represent the distance between the LWIR sensor S and the LWIR emitter E, and R represent a center point between S and E on the vertical axis. On the vertical glass wall 210, E' R' and S' that corresponds to the E, R and S are marked as reference point for illustrations. The thermal signature emits from the IR emitter E and reflected on the glass wall 210 at R' to reach the IR sensor S. L and α are known. Therefore, the distance between the autonomous system 200 and the wall can be determined as follows:

$$D = \frac{\frac{L}{2}}{\tan\alpha},$$

where ∡ SS'R' is 90°

It is apparent to a skilled person that angle α can be obtained easily through the specification of the IR sensor S (i.e. image array resolution and FOV), hence, further details is omitted herein.

Based on the illustrations in FIG. 2A and later in FIG. 2B below, the IR sensor S shall be a 2-dimensional (2D) thermal image sensor to determine angles α and β, whereby the angle β is required for direction to the wall, and the angle α for calculating the distance to the wall.

In this embodiment, the IR sensor S is an array sensor whereby the system may further detect a position (x, y) of the thermal signature (image) on the array sensor. Understanding that the thermal signature may occupied multiples pixels on the IR sensor S, the position (x,y) may just be a reference position of the thermal signature, or a position of one signal pixel of the thermal signature. Accordingly, an angle $\beta_x$ and an angle $\alpha_y$ can be determined accordingly for each x-coordinate and y-coordinate (of the array sensor) respectively.

Figure 2B:
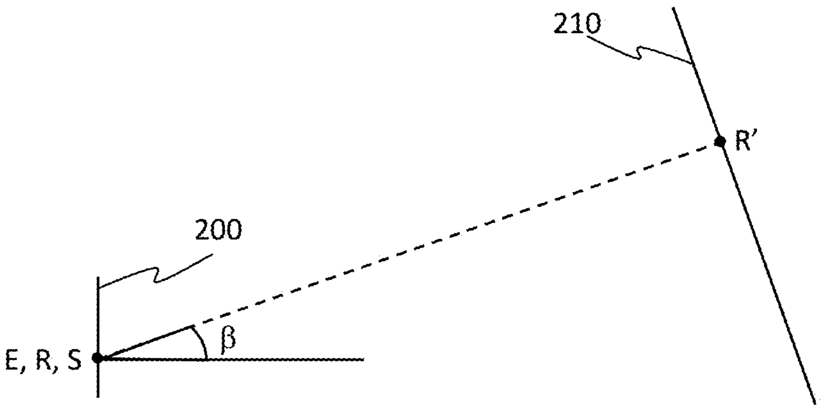
FIG. 2B illustrates a plan view of the autonomous system of FIG. 2A fasting the glass wall.

FIG. 2B further shows a plan view of FIG. 2A. In this plan view, the points E, R and S are shown on the same point. As shown by the reference dotted line ER', the only direction where the signal from the IR emitter E can be detected by the IR sensor S is when line ER' is orthogonal to the glass wall 210, i.e. ER' is the shortest distance from the device to the glass wall 210, and the direction is determined as angle β. Similarly, it is also apparent to a skilled person that the angle β can also be obtained based on the speciation of the sensor.

In other embodiments of the present invention, the autonomous system 100 may includes more than one IR emitters E. In further embodiment, the multiple IR emitters E may emit different thermal signal signatures, which may assist to obtain more information or features of the glass wall, such as edges of the glass wall. With multiple IR emitters E, the IR sensor S may received multiple responses when the thermal signatures are reflected on the glass wall. Depending on the location/position of the IR emitters E relative to the IR sensor S on the autonomous system present/absent of the thermal signatures that can be detected by the IR sensor from the glass wall can be used as references to determine features and profiles of the glass wall.

Figure 3:
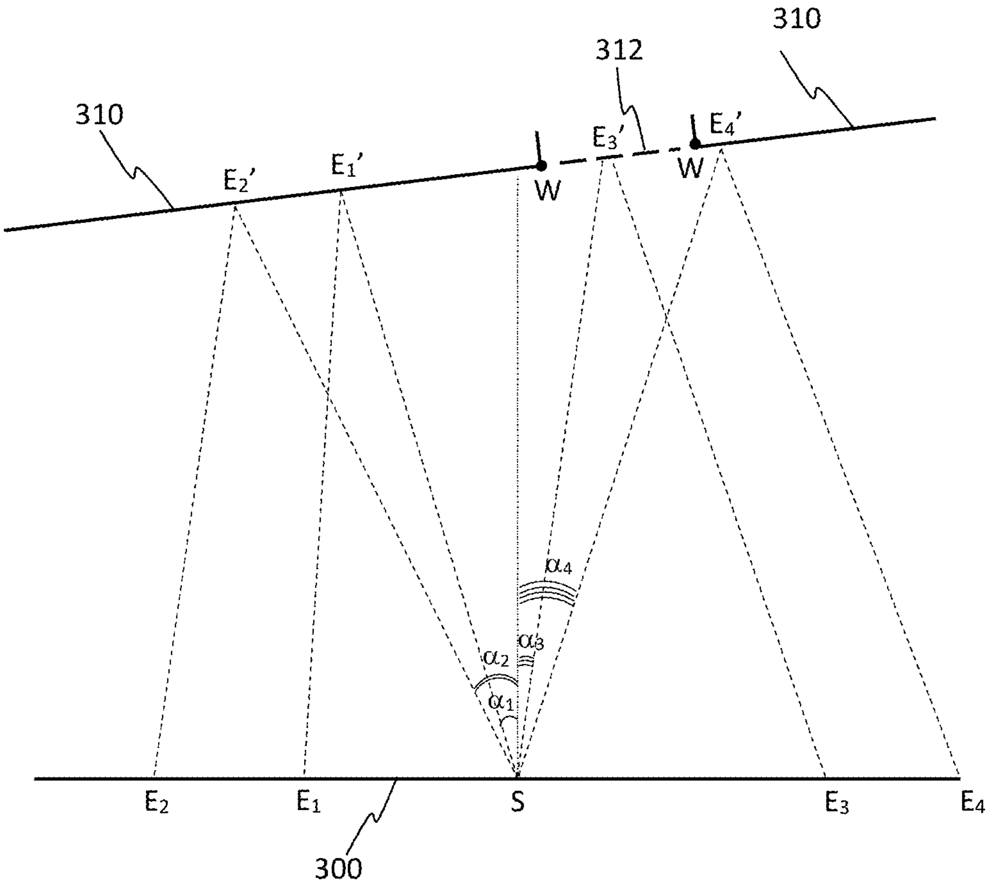
FIG. 3 illustrates a plan view of an autonomous system having a sensor assembly for detecting glass wall in accordance with an embodiment of the present invention.

FIG. 3 illustrates a plan view of an autonomous system 300 having a sensor assembly for detecting glass wall 310 in accordance with an embodiment of the present invention. In the present illustration, the glass wall 310 is slanted relative to the direction where the autonomous system 300 is facing. In this embodiment, the sensor assembly comprises an IR sensor S and four IR emitters $E_1$, $E_2$, $E_3$ and $E_4$, wherein two emitters are arranged linearly on each side of the IR sensor S. The glass wall 310 has an opening or window W denoted by dotted lines, which is an void space or non-reflective surface. The opening W can be a door opening. Further as shown, the autonomous system 300 is positioned in front of the glass wall 310. When the sensor assembly is in operation, the IR emitters respectively emits thermal signatures on the glass wall 310, and the IR sensor S scans the glass wall 310 for the thermal signatures. As shown in FIG. 3, thermal signatures from $E_1$, $E_2$ and $E_4$ are reflected (denoted as $E_1'$, $E_2'$ and $E_4'$ in FIG. 3) on the glass panel 310 and detectable by the IR sensor S. E3 will not be detected as it falls on a non-reflective surface, hence, it shall be deemed as no glass surface on that point.

It is understood to a skilled person that autonomous system 300 would usually comprises several detection-means to scanning for non-reflective obstacles. In the case where the other detection-means also does not detect any obstacles on the opening W, it can be determined that it is a void space. More specifically, the present embodiment is capable of approximating the opening W between $E_2'$ and $E_4'$.

In this embodiment, placements of the IR sensors S are linearly arranged and parallel to ground. It is known that increasing the number of emitters E and/or sensors S can be used to increase the accuracy of the approximations above.

Further in FIG. 3, when the autonomous system 300 pans about its current location before the glass wall 310, the IR sensor S will detect the thermal signals $E_1'$, $E_2'$, $E_3'$ and $E_4'$ can be detected when emitted on the reflective surface (i.e. glass wall 300), and absence when it hits the opening W. Such continuous scannings and detections can further determine the shape, including the glass wall edges. It is to be noted that the emitters E and the sensors S as required by the present invention are very low cost components, and they are highly cost effective to be implemented in any autonomous system in accordance with the embodiment of the present invention. Operationally, when the sensor assembly is panning over an area on the autonomous system, the captured images can be collectively used to map the area by determining the present and absent of the thermal signatures. Accuracy of the mapping results can be affected by the the resolutions and/or the frame rate of the IR sensor S.

By combining the concepts in computational geometry and computer vision, simultaneous localization and mapping can be realized by the autonomous system. By analyzing the distances to objects in its field of view, the autonomous system can build a map of its surroundings and use that map to navigate and avoid obstacles, including glass wall/panel, with the aid of the embodiments of the present invention.

There are other system and method known in the art and hence these details are omitted herein for simplicity.

It is also to be noted that the distance between emitters E and the sensor S can be varied according to the design of the autonomous system 300.

Figure 4A:
FIGS. 4A, 4B and 4C exemplifies three thermal signature patterns according to embodiments of the present invention.
Figure 4B:
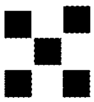
Figure 4C:
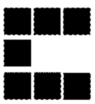

In one embodiment, the emitters E may be any thermal elements that can be controlled to emit thermal signature. It is desire that these emitters E emits thermal signatures that can be used as identification of the autonomous system from the ambient. The thermal elements can be any controllable thermal devices or components that can emit heat or cold in the range of −20° C. to +65° C. It can be a resistor, or a Peltier device. The advantage of using devices that is controllable by the system is that it can be adjusted and controlled to emit thermal signatures that distinguishable from the ambient temperature, hence thermal signature. The thermal signature can be identified through different temperature degrees. In another embodiment, it can be in some form of patterns visually identifiable by the sensor S, For example, the emitter E may comprise an array of resistors or Peltier devices arranged for form patterns operationally. FIGS. 4A, 4B and 4C exemplifies three thermal signature patterns, for illustrations only, not limitations.

As illustrated herein, the resistor array refers to plurality of resistors arranged in a manner to emit a desired thermal signature as required by the present invention. These resistor array or the plurality of resistors can be cheap and scalable solution to fabricate the emitter that emits the desired thermal signature. It can be packed as one device or it can be individual resistors disposed on the autonomous system. Each resistor unit can form one (thermal) pixel of the thermal signature, and the number of the resistor units to be included in the resistor array is highly customizable according to the application. This allows the thermal signature not only be controllable by the heat or its wavelength range, it can also be presented as patterns that unique to the autonomous system. These resistors are small in size and low cost. For avoidance of doubt, resistor array, individual resistor unit, etc. are not limitations to the present invention and shall be understood as possible means to emit thermal signature for detecting glass wall for autonomous system.

Figure 5:
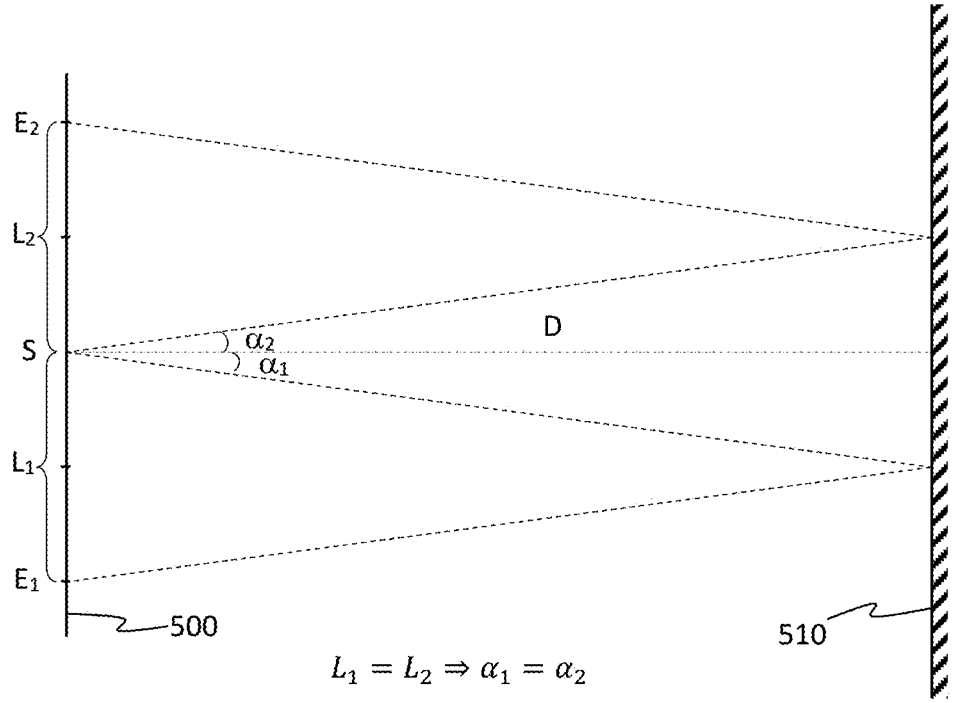
FIG. 5 illustrates a sensor assembly of an autonomous system in accordance with an embodiment of the present invention.

FIG. 5 illustrates plan view of a sensor assembly of an autonomous system 500 in accordance with an embodiment of the present invention. The autonomous system 500 comprises a IR sensor S and two IR emitters $E_1$ and $E_2$. The configurations allows calculation to to obtain a distance D from the autonomous system 500 to a glass wall 510 as illustrated. The two emitters E and the sensor S are installed in a linear arrangement wherein the two emitters E are installed L distance apart on each side from the sensor S. When the sensor assembly is in parallel orientation with the glass wall, for example $L_1=L_2$ and when $\alpha_1=\alpha_2$, the distance D from the autonomous system 500 to the glass wall 510 can be obtained.

In another embodiment, the sensor assembly of the autonomous system 500 may comprise two sensors S and one emitter E arranged in a similar way as the aforesaid embodiment and the distance between the autonomous system 500 and the glass wall 510.

Figure 6:
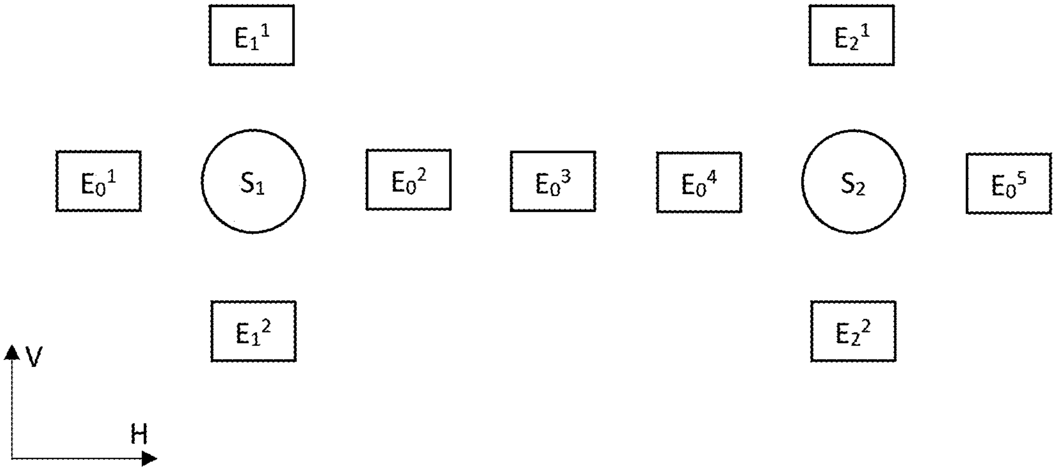
FIG. 6 illustrates another sensor assembly for an autonomous system in accordance with another embodiment of the present invention.

FIG. 6 illustrates another sensor assembly 600 in accordance with another embodiment of the present invention. The sensor assembly 600 comprises two sensor $S_1$, $S_2$ and nine (9) emitters E. The sensor $S_1$ and $S_2$ are arranged side by side forming a reference axis (not shown). The emitters $E_0^1$, $E_0^2$, $E_0^3$, $E_0^4$ and $E_0^5$ are all arranged alongside with S1 and S2 on the same reference axis, in the sequence of:

$$E_0^1 - S_1 - E_0^2 - E_0^3 - E_0^4 - S_2 - E_0^5$$

The arrangements of the emitters $E_0^n$ are configured to scan and detect the edges and profile of the glass wall as described in the above embodiments.

The emitters $E_1^1$ and $E_1^2$ are respectively disposed above and below the sensor $S_1$; the emitters $E_2^1$ and $E_2^2$ are respectively disposed above and blow the $S_2$. The emitters $E_1^1$ and $E_1^2$ are provided to measure distance and direction to $S_1$; the emitters $E_2^1$ and $E_2^2$ are provided to measure distance and direction to $S_2$.

According to the present invention, there is no limit for the number of sensor S and/or emitters E required in a sensor assembly. It is understood to a skilled person that the number required would depend on the applications therefor. The emitter can be of any suitable size, shape and temperature emission required for the applications. The thermal signature may further be changes operationally to render unique thermal signature for each emitter to enhanced its applicability.

Out of the wide spectrum of IR that can be detected through any thermal imaging camera, it is desired that long-wavelength IR, aka far-IR is used. In other word, the system may adopt a long-wavelength IR (LWIR) sensor and a long-wavelength IR (LWJR) emitter for detecting presence of glass wall in an alternative embodiment of the present invention. Also as illustrated earlier, the autonomous system may equip with more than one LWIR sensor and/or more than one LWIR emitters. Multiple sensors and/or emitters offer flexibility and accuracy to detect glass walls.

The present offers a solution for an autonomous system to detect glass wall by using a thermal imaging device to detect a reflected image of thermal signature from the autonomous system.

While specific embodiments have been described and illustrated, it is understood that many changes, modifications, variations and combinations thereof could be made to the present invention without departing from the scope of the invention.

The invention claimed is:

1. A method for detecting glass wall with reflective surface for an autonomous system, the method comprising:

deploying at least one IR imaging device and at least one IR thermal emitter on the autonomous system, wherein the IR imaging device comprises a field-of-view (FOV) and is sensitive to long-wavelength infrared (LWIR) band of 8-15 μm;

the IR thermal emitter comprises a resistor array configured to emit; an IR thermal signature in the 8-15 μm band by resistive heating and the IR thermal signature is located outside of the FOV;

detecting presence of the IR thermal signature that reflects by the reflective surface within the FOV; and determining a distance and angle of the autonomous system from the reflective surface via triangulation based on the spatial displacement of the reflected IR thermal signature within the FOV, thereby identifying the reflective surface as the glass wall.

2. The method of claim 1, wherein each IR emitter comprising resistors arranged to emits the IR thermal signature.

3. The method of claim 1, wherein the IR emitter comprising a resistor array arranged to form the thermal signature.

4. The method of claim 1, wherein the autonomous system determines the distance and angle based on triangulation method.

5. A sensor assembly of an autonomous system adapted for detecting glass wall, the sensor assembly comprising:

at least one infrared (IR) thermal sensor having a Field-of-View (FOV) and being sensitive to a long-wavelength infrared (LWIR) band of 8-35 μm;

at least one IR emitter that operationally emits a thermal signature in the 8-15 μm band by resistive beating;

whereby operationally, when IR thermal signature is reflected on a reflected surface and the reflected IR thermal signature is captured within the FOV, the sensor assembly determines a distance and angle of the IR sensor from the reflective surface via triangulation based on spatial displacement of the reflected IR thermal signature within the FOV and the reflective surface is identified as a glass wall.

6. The sensor assembly according to claim 5, each of the IR thermal emitter comprises a resistor array, each resistor unit of the resistor array form a pixel of the thermal signature.

7. The sensor assembly according to claim 5, wherein the distance and angle are determined through triangulation.

8. An autonomous system having a sensor assembly in accordance with claim 5.

* * * * *